United States Patent
Nádas et al.

(10) Patent No.: US 11,362,956 B2
(45) Date of Patent: Jun. 14, 2022

(54) PROBABILISTIC SERVICE LEVEL AGREEMENTS (SLA)

(71) Applicant: Telefonaktiebolaget LM Ericsson (publ), Stockholm (SE)

(72) Inventors: Szilveszter Nádas, Budapest (HU); Illés Antal Horváth, Budapest (HU); András Mészáros, Budapest (HU); Miklos Telek, Budapest (HU); Balázs Varga, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/283,865

(22) PCT Filed: Jan. 11, 2019

(86) PCT No.: PCT/EP2019/050705
§ 371 (c)(1),
(2) Date: Apr. 8, 2021

(87) PCT Pub. No.: WO2020/074125
PCT Pub. Date: Apr. 16, 2020

(65) Prior Publication Data
US 2021/0385165 A1 Dec. 9, 2021

Related U.S. Application Data

(60) Provisional application No. 62/744,762, filed on Oct. 12, 2018.

(51) Int. Cl.
*H04L 47/215* (2022.01)
*H04L 47/28* (2022.01)
*H04L 47/32* (2022.01)

(52) U.S. Cl.
CPC ............ *H04L 47/215* (2013.01); *H04L 47/28* (2013.01); *H04L 47/326* (2013.01)

(58) Field of Classification Search
None
See application file for complete search history.

(56) References Cited

U.S. PATENT DOCUMENTS 6,868,063 B1 * 3/2005 De Cnodder ........... H04L 47/10
370/236
2007/0153682 A1 7/2007 Swenson et al.
(Continued)

OTHER PUBLICATIONS

International Search Report and Written Opinion dated Apr. 15, 2019 for International Application No. PCT/EP2019/050705 filed Jan. 11, 2019, consisting of 12-pages.
(Continued)

*Primary Examiner* — Anh Vu H Ly
(74) *Attorney, Agent, or Firm* — Christopher & Weisberg. P. A.

(57) ABSTRACT

Regulating transmission of data packets between a first network and a second network over a datalink. Embodiments include determining a first plurality of token bucket rate (TBR) parameters, each TBR parameter corresponding to a one of a first plurality of packet drop precedence (DP) levels and one of a first plurality of timescales (TS). The determination of the first plurality of bucket rate parameters is based on a peak rate requirement, the data link capacity, and a nominal speed requirement associated with the data link. Embodiments also include determining a second plurality of TBR parameters based on the first plurality of TBR parameters and a guaranteed rate requirement, the second plurality comprising a further DP level than the first plurality. Embodiments also include regulating data packets sent between the first network and the second network via the data link based on the second plurality of TBR parameters.

20 Claims, 7 Drawing Sheets

(56) References Cited

U.S. PATENT DOCUMENTS

2017/0078209 A1* 3/2017 Miklós ............... H04L 47/2441
2022/0006743 A1* 1/2022 Nadas ................. H04L 47/215

OTHER PUBLICATIONS

MEF Technical Specification MEF 10.2; Ethernet Services Attributes Phase 2; Oct. 27, 2009, consisting of 65-pages.
Szilveszter Nádas et al.; Multi timescale bandwidth profile and its application for burst-aware fairness; Traffic Analysis and Network Performance Laboratory, Ericsson Research; Mar. 19, 2019, Hungary, consisting of 7-pages.
J. Heinanen et al.; A Two Rate Three Color Marker; Network Working Group; The Internet Society, Sep. 1999, consisting of 5-pages.
Miriam Allalouf et al.; A Simulation Study of Multi-Color Marking of TCP Aggregates; ResearchGate; Nov. 2007, consisting of 11-pages.

\* cited by examiner

MEF: $R = \begin{bmatrix} 2000 \\ 8000 \end{bmatrix}$

22b: $R = \begin{bmatrix} 6000 & 1000 \\ 8000 & 1000 \end{bmatrix}$ (return rule holds, baseline)

22c: $R = \begin{bmatrix} 6000 & 1000 \\ 8000 & 1250 \end{bmatrix}$ (no return rule, $R_{12} + R_{22} > C/N$)

22d: $R = \begin{bmatrix} 5200 & 1200 \\ 8000 & 1000 \end{bmatrix}$ (no return rule, $R_{12} + R_{22} > C/N$)

22e: $R = \begin{bmatrix} 6000 & 1000 \\ 8000 & 500 \end{bmatrix}$ (no return rule, $R_{12} + R_{22} < C/N$)

```
┌─────────────────────────────────────────────────────────────────────┐
│ Determining a first plurality of token bucket rate parameters, each │
│ parameter corresponding to a one of a first plurality of packet drop│
│ precedence (DP) levels and one of a first plurality of timescales   │─810
│ (TS), wherein determining the first plurality is based on a peak    │
│ rate requirement, the data link capacity, and a nominal speed       │
│ requirement associated with the data link.                          │
│ ┌─────────────────────────────────────────────────────────────────┐ │─812
│ │ Determining a first parameter according to a peak rate          │ │
│ │ requirement.                                                    │ │
│ ├─────────────────────────────────────────────────────────────────┤ │─814
│ │ Determining a second parameter based on the difference between  │ │
│ │ the peak rate and the data link capacity                        │ │
│ ├─────────────────────────────────────────────────────────────────┤ │─816
│ │ Determining a third parameter based on a nominal speed          │ │
│ │ requirement associated with the datalink.                       │ │
│ ├─────────────────────────────────────────────────────────────────┤ │─818
│ │ Determining a fourth parameter based on the data link capacity. │ │
│ └─────────────────────────────────────────────────────────────────┘ │
└─────────────────────────────────────────────────────────────────────┘
                                    ▼
┌─────────────────────────────────────────────────────────────────────┐
│ Determining a second plurality of token bucket rate parameters based│
│ on the first plurality of token bucket rate parameters and a        │─820
│ guaranteed rate requirement, wherein the second plurality comprises │
│ a further DP level than the first plurality.                        │
│ ┌─────────────────────────────────────────────────────────────────┐ │
│ │ Determining a second plurality of DP levels, wherein the second │ │─822
│ │ plurality comprises a first DP level corresponding to the       │ │
│ │ further DP level and a second DP level corresponding to a first │ │
│ │ one of the first plurality of DP levels.                        │ │
│ ├─────────────────────────────────────────────────────────────────┤ │
│ │ Determining token bucket rate parameters for the first / second │ │
│ │ DP levels based on:                                             │ │
│ │ a requirement that, for a particular TS, the sum of the         │ │
│ │ determined token bucket rate parameters for the first and second│ │─824
│ │ DP levels must equal a token bucket rate parameter determined   │ │
│ │ for the first one of the first plurality of DP levels;          │ │
│ │ a guaranteed rate requirement according to an average capacity  │ │
│ │ of lines comprising the data link; and                          │ │
│ │ a fractional guarantee factor relating the first DP level and   │ │
│ │ the second DP level.                                            │ │
│ ├─────────────────────────────────────────────────────────────────┤ │
│ │ Set each of the token bucket rate parameters associated with a  │ │─826
│ │ highest DP level to the data link capacity.                     │ │
│ └─────────────────────────────────────────────────────────────────┘ │
└─────────────────────────────────────────────────────────────────────┘
                                    ▼
┌─────────────────────────────────────────────────────────────────────┐
│ Determining a third plurality of token bucket rate parameters based │
│ on:                                                                 │
│ the second plurality of token bucket rate parameters;               │─830
│ a plurality of file sizes for files expected to be sent between the │
│ first network and the second network via the data link; and         │
│ a plurality of file bandwidth requirements associated with the      │
│ respective file sizes.                                              │
│ ┌─────────────────────────────────────────────────────────────────┐ │
│ │ Determining the first plurality of TS based on: the plurality of│ │
│ │ file sizes; the plurality of file bandwidth requirements; and a │ │─832
│ │ duration which a leased line comprising the data link must be   │ │
│ │ above its nominal bitrate to be considered a heavy leased line  │ │
│ └─────────────────────────────────────────────────────────────────┘ │
└─────────────────────────────────────────────────────────────────────┘
                                    ▼
┌─────────────────────────────────────────────────────────────────────┐
│ Regulating data packets sent between the first network and the      │─840
│ second network via the data link based on the second [third]        │
│ plurality of token bucket rate parameters.                          │
│ ┌─────────────────────────────────────────────────────────────────┐ │
│ │ Performing one of the following operations based on the DP level│ │
│ │ marked on each data packet: forwarding the data packet to the   │ │─842
│ │ first network, forwarding the data packet to the second network,│ │
│ │ and discarding the data packet.                                 │ │
│ └─────────────────────────────────────────────────────────────────┘ │
└─────────────────────────────────────────────────────────────────────┘
```

PROBABILISTIC SERVICE LEVEL AGREEMENTS (SLA)

CROSS-REFERENCE TO RELATED APPLICATIONS

This application is a Submission Under 35 U.S.C. § 371 for U.S. National Stage Patent Application of International Application No.: PCT/EP2019/050705, filed Jan. 11, 2019 entitled "DESIGN OF PROBABILISTIC SERVICE LEVEL AGREEMENTS (SLA)," which claims priority to U.S. Provisional Application No. 62/744,762, filed Oct. 12, 2018, the entireties of both of which are incorporated herein by reference.

TECHNICAL FIELD OF THE DISCLOSURE

The present invention generally relates to communication networks, and particularly relates to transmission of data traffic in communication networks according to probabilistic service level agreements (SLAs) between a subscriber and a communication service provider.

BACKGROUND INFORMATION

The term "Service Level Agreement" (or SLA for short) is commonly used in the field of telecommunications to refer to an agreement between a subscriber and a service provider that specifies service level commitments and related business agreements. The SLA can be set up in a standardized manner according to specific terms and rates. For example, the SLAs standardized by Metro Ethernet Forum (MEF) in technical specification (TS) 10.2 have been used extensively for Ethernet Leased Lines.

MEF Technical Specification 10.2 specifies a Standard Bandwidth Profile that includes various parameters and algorithms related to the delivery of Service Frames (e.g., packets) by the network. One of the parameters is a Committed Information Rate (CIR), which defines the average rate in bits/s of Service Frames up to which the network delivers Service Frames and meets the performance objectives defined by a Class of Servce (CoS) Attribute. In other words, as long as packets are sent with a speed and a burstiness compliant with the CIR of a SLA, all packets will be transmitted with a high probability (~100%). Another parameter is the Excess Information Rate (EIR), which defines the average rate in bits/s up to which the network may deliver Service Frames but without any performance and/or delivery guarantee.

A physical link can be dimensioned to ensure that it has capacity enough to cater for a sum of all CIRs of the SLAs for services using the link. In case of a high number of services sharing a link, additional gains can sometimes be achieved via statistical multiplexing, due to the likelihood that all services are not transmitting at the CIR during any given time period and, in fact, are often not even active during a given time period. However, when the number of services is relatively small—such as in backhaul for access networks—statistical multiplexing does not achieve significant capacity gains.

Figure 2:
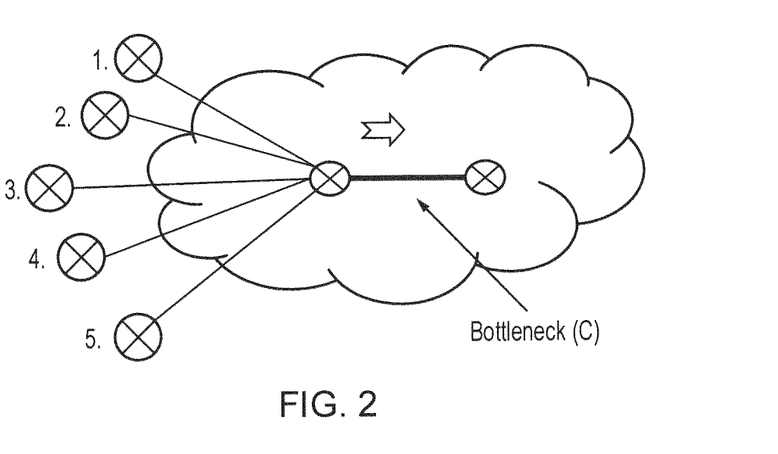
FIG. 2 illustrates the scenario of traffic from five (5) cells encountering a bottleneck on a link with capacity C that serves these cells (e.g., a backhaul link).

Traffic sources, or services, are called "bursty" when their amount of traffic per unit time varies greatly across different time periods and/or time frames. If link capacity is dimensioned by a CIR according to an SLA, bursty traffic may encounter a bottleneck on the link during high periods. For example, when peak air interface capacity of one or more cells in a cellular network increases, a backhaul link serving these cells can become a bottleneck. This is illustrated by FIG. 2, which shows five traffic sources (e.g., cells 1-5) encountering a bottleneck on a link (e.g., backhaul) link serving these cells. Even so, peak air interface throughput is not always achieved since it requires favorable radio conditions for transmission between the base station and user equipment (UEs). More typically, the cell air interface provides a smaller capacity than the peak air interface capacity. In other words, the traffic from the cell is bursty, making dimensioning the capacity of a backhaul link difficult.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Figure 1:
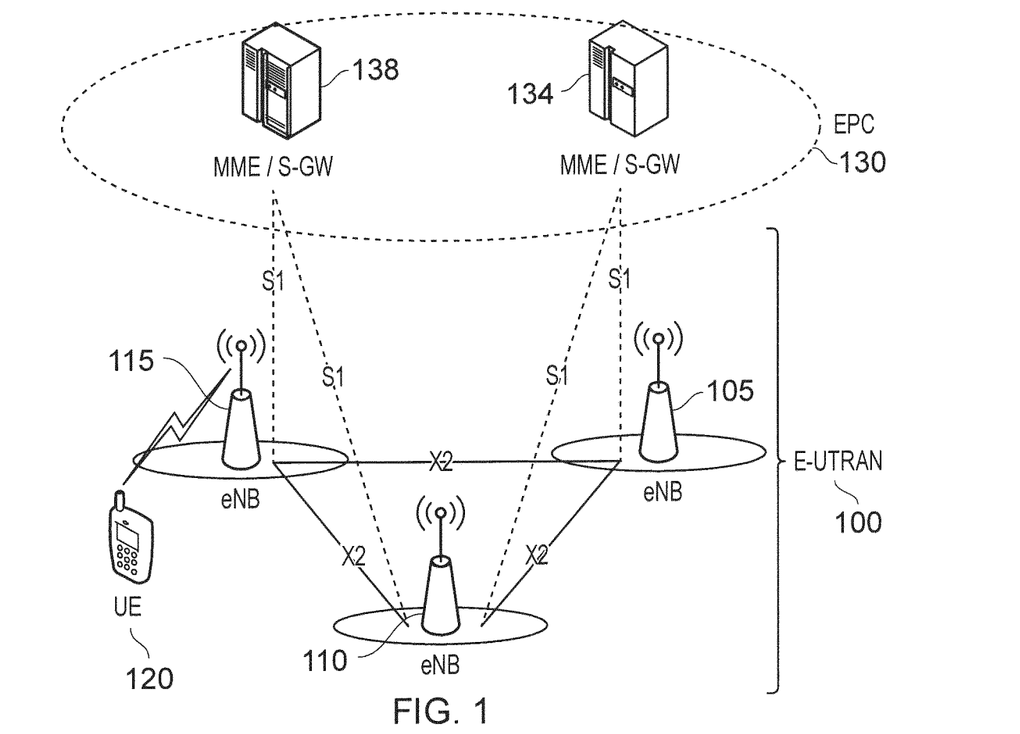
FIG. 1 is a high-level block diagram of an exemplary architecture of the Long Term Evolution (LTE) Evolved UTRAN (E-UTRAN) and Evolved Packet Core (EPC) network, as standardized by 3GPP.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known. Each of eNBs 105, 110, and 115 can provide, or serve, one or more cells covering a particular geographic area. For example, UE 120 is located in a cell served by eNB 115.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 2. The eNBs also are responsible for the E-UTRAN interface to the EPC, specifically the S1 interface to the Mobility Management Entity (MME) and the Serving Gateway (S-GW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

In the context of the exemplary network shown in FIG. 1, one or more backhaul links can be used to carry traffic on the S1 interface between eNBs 105, 110, and 115 and MME/S-GWs 134, 138. In some cases, one or more backhaul links can be used to carry traffic on the X2 interface between eNBs 105, 110, and 115. For example, each backhaul link can be an Ethernet leased line subject to a SLA.

One conventional technique for traffic shaping to meet SLAs in communication networks (e.g., backhaul networks) is the use of "token buckets." For example, MEF TS 10.2 defines Committed and Excess token buckets. Each token bucket is associated with an allowed bitrate of traffic ("token bucket rate", e.g., in bits/s) relating to a service provided under the SLA. The token buckets are also associated with a bucket length, which is a maximum amount of tokens that a token bucket can hold. The bucket length represents the token bucket rate maintained over a duration of time ("timescale"), or equivalently, a maximum allowed burst size in bits or bytes. Note that a bucket length can be converted to a timescale by dividing it by the token bucket rate.

In many applications, data is buffered before transmission in a communication network. Each buffer is associated with a duration in time (or length). To avoid buffer overflow, the timescale of a token bucket used to service a buffer must be less than or equal to the buffer length. In other words, a data packet is "in-profile" if there are enough tokens in the token bucket to put that packet in the data buffer, without risk of buffer overflow before the packet is sent. When an in-profile packet is handled, a number of tokens corresponding to the packet size are removed from the token bucket.

Although token buckets facilitate SLAs for certain classes of traffic, they have various shortcomings for handling highly bursty traffic, such as seen on backhaul networks that connect cell sites to other parts of a cellular network (e.g., a core network). Various techniques that have been proposed to address this problem suffer from various drawbacks, such as lacking a formal approach for setting the token rate of token buckets used to handle bursty traffic.

SUMMARY

Embodiments of the present disclosure provide specific improvements to the regulation of transmission of data packets between a first network and a second network over a datalink, such as by according to a service level agreement (SLA) specifying datalink performance. For example, these improvements can overcome the exemplary problems described above.

Some exemplary embodiments of the present disclosure include methods and/or procedures for regulating transmission of data packets between a first network and a second network over a datalink. The exemplary methods and/or procedures can be performed by a network node (e.g., router, Ethernet switch, or component thereof) in communication with the first network (e.g., an access network) and the second network (e.g., a core network).

The exemplary methods and/or procedures can include determining a first plurality of token bucket rate parameters, each parameter corresponding to a one of a first plurality of packet drop precedence (DP) levels and one of a first plurality of timescales (TS). The first plurality of token bucket rate parameters can be determined based on a peak rate requirement, the data link capacity, and a nominal speed requirement associated with the data link.

The exemplary methods and/or procedures can also include determining a second plurality of token bucket rate parameters based on the first plurality of token bucket rate parameters and a guaranteed rate requirement, wherein the second plurality comprises a further DP level than the first plurality.

In some embodiments, the exemplary methods and/or procedures can also include determining a third plurality of token bucket rate parameters based on: 1) the second plurality of token bucket rate parameters; 2) a plurality of file sizes for files expected to be sent between the first network and the second network via the data link; and 3) a plurality of file bandwidth requirements associated with the respective file sizes. In some embodiments, determining a third plurality of token bucket rate parameters can include determining the first plurality of TS based on: 1) the plurality of file sizes; 2) the plurality of file bandwidth requirements; and 3) a duration which a leased line comprising the data link must be above its nominal bitrate to be considered a heavy leased line.

The exemplary methods and/or procedures can also include regulating data packets sent between the first network and the second network via the data link based on the second plurality of token bucket rate parameters. In some embodiments, this can include regulating the data packets sent between the first network and the second network via the data link based on the third plurality of token bucket rate parameters, which can be determined based on the second plurality of token bucket rate parameters. In some embodiments, regulating data packets can include performing one of the following operations based on the DP level marked on each data packet: forwarding the data packet to the first network, forwarding the data packet to the second network, and discarding the data packet.

Other exemplary embodiments include network nodes (e.g., Ethernet switches, routers, controllers, etc. or components thereof) configured to perform operations corresponding to various exemplary methods and/or procedures described above. Other exemplary embodiments include non-transitory, computer-readable media storing program instructions that, when executed by at least one processor, configure such network nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 8 is a flow diagram of an exemplary method and/or procedure for regulating transmission of data packets between a first network and a second network over a datalink, according to various exemplary embodiments of the present disclosure.

DETAILED DESCRIPTION

As briefly mentioned above, although token buckets facilitate SLAs for certain classes of traffic, they have various shortcomings for handling highly bursty traffic, such as seen on backhaul networks that connect cell sites to other parts of a cellular network (e.g., a core network). For example, existing solutions cannot provide guarantee for bursty traffic sources and still achieve multiplexing gain. Some existing solutions generally aim to have close to 0% drop probability for in-profile packets (i.e. fitting to CIR). Some existing solutions also introduce extra packet allowance with no associated drop probability guarantee, but that cannot be used to provide verifiable guarantees. In other words, the guaranteed part is always there and there is no incentive to not use it always.

In the specific context of backhaul networks, there is no existing SLA that can be used to aggregate backhaul traffic of a few cellular base stations (e.g., 3-20) while meeting peak capacity demands of the cells and achieving statistical multiplexing gains on an aggregation of individual lines (e.g., Ethernet) leased for the backhaul.

Figure 7:
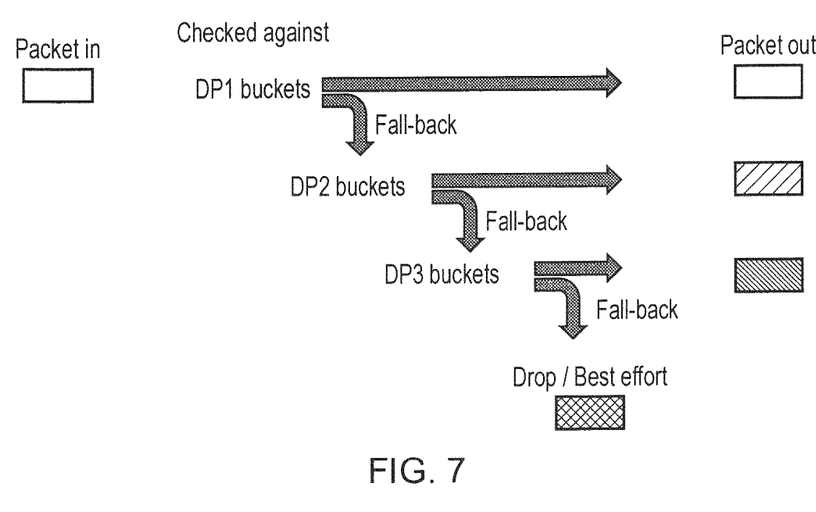
FIG. 7 depicts marking of the incoming packets and falling back to higher DP levels in the case when an incoming packet cannot fit into the buckets of a particular DP level, according to various exemplary embodiments of the present disclosure.

One technique proposed to address this problem included definition of several Drop Precedence (DP) levels, e.g., DP=1 is dropped last, DP=2 second last, etc. Various time scales (e.g. 100 ms, 1 s, 1 min, 1 hour) were defined for each DP level, and a token bucket was assigned to each combination of time scale and DP level. For a particular DP level, the token rate of the associated token buckets was is configured in inverse relation to the timescale (e.g., decrease as time scale increases), and the length of the associated token buckets is configured in direct relation to the timescale (e.g., increase as time scale increases). An incoming packet can be marked with a particular DP level only if all token buckets of different timescales associated with that DP level have enough tokens. In such case, a packet-size amount of tokens is deducted from each of these token buckets. FIG. 7 depicts marking of the incoming packets and falling back to higher DP levels in the case when an incoming packet cannot fit into the buckets of a particular DP level.

Within these general principles, however, these techniques lack a formal approach for setting the token rate of the token buckets. This includes lack of specific performance requirements as well as how to translate such requirements into token bucket rates. This is discussed in more detail below.

Figure 3:
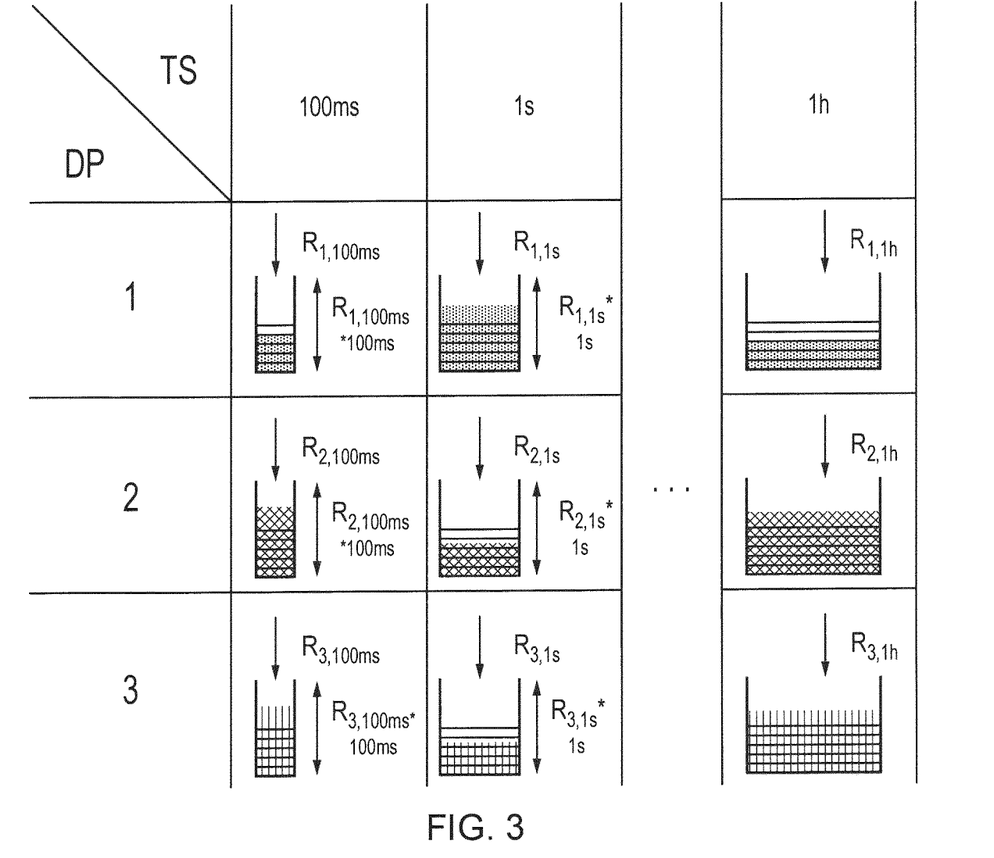
FIG. 3 illustrates an exemplary arrangement of three drop precedence (DP) levels, three time scales, and the associated token buckets according to various exemplary embodiments.

FIG. 3 illustrates an exemplary arrangement of three (3) DP levels, three (3) time scales (e.g., 100 milliseconds, 1 second and 1 hour), and the associated token buckets according to these embodiments. In general, however, there can be M DP levels and N timescales. Each of the token buckets is associated with a token bucket rate $R_{ij}$ (in bits/second), where i=DP level and j=timescale. For convenience, the collection of token bucket rates can be represented as a matrix R with M rows (corresponding to DP levels) and N columns. Furthermore, the token bucket length $L_{ij}$ for DP level i and timescale j is given by $R_{ij}*tj$, where tj is the duration of the timescale j (e.g., in seconds (s), where 100 ms=0.1 s). Table 1 below provides exemplary token bucket rates corresponding to the arrangement shown in FIG. 3, while FIG. 4 graphically illustrates other exemplary token bucket rates according to the arrangement shown in FIG. 3.

Figure 4:
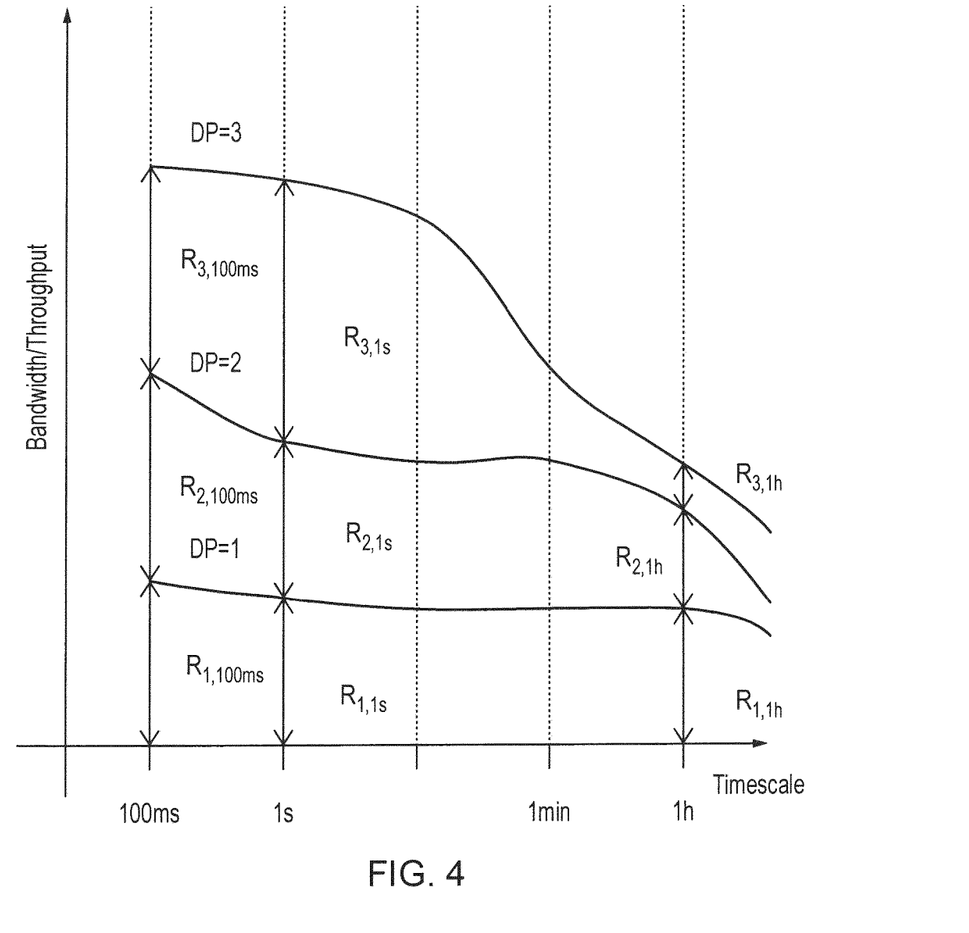
FIG. 4 graphically illustrates exemplary token bucket rates according to the arrangement shown in FIG. 3.

It can be seen in both Table 1 and FIG. 4 that all token rates decrease as the time scale increases

TABLE 1

| DP level | TS (R) | | |
|---|---|---|---|
| | 100 ms | 1 s | ... 1 h ($N^{th}$ TS) |
| DP = 1 | $R_{11}$ = 10 Mbps | $R_{12}$ = 8 Mbps | $R_{1N}$ = 4 Mbps |
| DP = 2 | $R_{21}$ = 15 Mbps | $R_{22}$ = 10 Mbps | $R_{2N}$ = 6 Mbps |
| DP = 3 (Mth DP) | $R_{31}$ = 20 Mbps | $R_{32}$ = 15 Mbps | $R_{3N}$ = 8 Mbps |

Exemplary embodiments of the present disclosure provide novel techniques for determining the $R_{ij}$ parameters of the bandwidth profiler matrix R based on various performance and system stability requirements. For example, these exemplary embodiments can accommodate requirements such as: 1) download speed of differently sized files arriving to a previously empty leased line; 2) work conservation (e.g., when there is traffic, it shall be able to use the whole bottleneck); 3) guaranteed bitrate and time period pairs, where a leased line active for the given time period can still reach the defined guaranteed bitrate; and 4) a nominal bitrate that can be maintained over a long duration.

Accordingly, exemplary embodiments include various techniques for determine the values of R for a bottleneck link with capacity C and with $N_{LL}$ identical leased lines over the bottleneck link. As used in the description of these exemplary embodiments, the term "nominal speed" of a leased line refers to the typical long term fair share of the line. For a bottleneck link, such as shown in FIG. 2, with capacity C distributed over $N_{LL}$ identical leased lines (LL), the nominal speed is $C/N_{LL}$. In addition, the term "nominal load" of a leased line refers to the average traffic arriving to the line divided by its nominal speed. In many cases, an SLA for a leased line should allow a user to reach the nominal speed in the long run or, in other words, to reach a nominal load=1 in the long run.

Several exemplary requirements for these novel techniques are explained below. According to one exemplary requirement, for a given DP level I, the row values of R must be monotonously decreasing, e.g., if j<k then $R_{ij} \geq R_{ik}$ (referred to as "monotonically decreasing" requirement). Even if this requirement is not true, the rate of the DP=1 part of the flow is always limited by $R_{11}$. This is because the token bucket associated with $R_{11}$ is smaller due to the smaller timescale, so it is depleted more quickly. Another exemplary requirement is that all $R_{ij}$ must be non-zero. A token bucket not meeting this requirement would never fill. Furthermore, each $R_{ij}$ must not be so small that the bucket fills so slowly that it would take too long to recover from a longer time scale behavior (referred to as "too small" requirement).

Another exemplary requirement (referred to herein as a "return rule") is that a leased line shall be able to maintain sending with the nominal speed. When a leased line is sending with a speed smaller than its nominal speed, it shall be able to reach a "good history state" after a while. To meet this requirement, the last column of the R matrix must contain the nominal speed. In other words, there must exist a column j where $C/N_{LL}=R_{1N} \ldots +R_{jN}$. If this condition is not met, a leased line with nominal load<1 might be stuck in a "heavily loaded state".

Exemplary embodiments of the procedure for determining the $R_{ij}$ parameters can begin with a 2×2 matrix R, given by:

$$R = \begin{bmatrix} R_{11} & R_{12} \\ R_{21} & R_{22} \end{bmatrix} \quad \text{(Eq. 1)}$$

These parameters of the matrix R may be referred to as the first plurality of token bucket rate parameters. These first plurality of token bucket rate parameters may be determined based on a peak rate requirement, $R_{target}$ the data link capacity, C, and a nominal speed requirement $C/N_{LL}$ (or NS) associated with the data link. An initial requirement (referred to as "single peak rate requirement") in the procedure is that when a flow arrives to an empty leased line and all other lines have a bad history, then the single flow shall be able to reach $R_{target}$. The "good history" of this selected line means that the $DP_1$ token buckets of the line's bandwidth profiler are full, while $DP_1$ token buckets of the other leased lines are empty. In such case, the capacity C can be shared according to the following two rules that determine the values of a first parameter RH and a second parameter $R_{12}$ of the first plurality of token bucket rate parameters:

$R_{target}$ throughput to the selected line. ($R_{11}=R_{target}$)

The rest divided evenly among the rest of the lines, i.e. $R_{12}=(C-R_{target})/(N_{LL}-1)$.

In addition, the "return rule" and the definition of "nominal speed" constraints the value of a third parameter of the first plurality of token bucket rate parameters, $R_{22}$, such that $R_{22}=C/N_{LL}-R_{12}$. The fourth parameter of the first plurality of token bucket rate parameters $R_{21}$, can be set to $R_{21}=C$ so as not to limit a leased line's total bandwidth when it has good history. For example, with C=10 Gb/s, $R_{target}$=6 Gb/s, $N_{LL}$=5, the resulting R matrix is given below (all values in Gb/s):

$$R = \begin{bmatrix} 6 & 1 \\ 10 & 1 \end{bmatrix} \quad \text{(Eq. 2)}$$

Although the above R is a starting point, it does not provide any strict guarantees because $N_{LL}*R_{11} \geq C$. In other words, if all lines have a good history and start transmission simultaneously, then $DP_1$ packets will be lost in an uncontrolled way. To create such strict guarantees, the exemplary procedure can include the first row of the 2×2 R matrix above can be divided by inserting another DP level to create a 3×2 matrix S, with the last row of S being the last row of R. In other words, a second plurality of token bucket rate parameters (for the parameters of the matrix S) are determined based on the first plurality of token bucket rate parameters (for example, the parameters of the matrix R) and a guaranteed rate requirement. To meet the "single peak rate" requirement, the sum of the first two rows of S must be the same as the first row of R, i.e. $S_{11}+S_{21}=R_{11}$ and $S_{12}+S_{22}=R_{12}$. In other words, for a particular TS, the sum of the determined token bucket rate parameters in the second plurality of token bucket rate parameters for the first and second DP levels equal the token bucket parameter determined for the first DP level in the first plurality of token bucket rate parameters. To make the guarantee as large as possible, $S_{11}=C/N_{LL}$ can be selected, which results in $S_{21}=R_{11}-S_{11}$.

The determination of $S_{12}$ and $S_{22}$ is subject to both the "too small" requirement and the "monotonically decreasing" requirement. Accordingly, a factor $f_{guarantee}$ to determine how much $R_{12}$ is maximally guaranteed. $S_{12}$ and $S_{22}$ then can be determined based on:

$S_{12}=\min(S_{11}f_{guarantee}*R_{12})$, $S_{22}=R_{12}-S_{11}$.

For example, extending the above example shown in Eq. 2 above to include a fractional guarantee factor $f_{guarantee}$=0.75 results in the following exemplary S matrix:

$$S = \begin{bmatrix} 2 & 0.75 \\ 4 & 0.25 \\ 10 & 1 \end{bmatrix} \quad \text{(Eq. 3)}$$

Note that the above R and S matrixes are not "work conserving," because it is possible for total amount of allowed transmission on all DP levels to be smaller than C (e.g., in Eq. 2, $R_{12}+R_{22}$=2 which is less than C=10). The above procedure can be extended, so as to extend the second plurality of token bucket rate parameters, to create a further system matrix (referred to as T) that complies with the "work conservation" requirement. For example, a new highest DP (i.e., row N) can be added, where all elements $R_{Nj}$ are equal to C. in that a single leased line can utilize the whole capacity when other leased lines do not transmit. An exemplary matrix T based on matrix S from Eq. 3 is given by:

$$T = \begin{bmatrix} 2 & 0.75 \\ 4 & 0.25 \\ 10 & 1 \\ 10 & 10 \end{bmatrix} \quad \text{(Eq. 4)}$$

Similarly, the step of utilizing the fractional guarantee as in matrix S may be optional, and the second plurality of token bucket rate parameters may be as for example in an exemplary matrix U based on matrix R from Eq. 2 which may be given by:

$$U = \begin{bmatrix} 6 & 1 \\ 10 & 1 \\ 10 & 10 \end{bmatrix} \quad \text{(Eq. 5)}$$

In some embodiments, the exemplary procedure can also be extended to account for download speed requirements for different file sizes. These operations can also determine the particular timescale values corresponding to the respective columns of R. For example, two files (e.g., files 1 and 2) can have file sizes $FS_1$, $FS_2$ (e.g., 1 Gbyte, 100 Mbytes) and download rate requirements $BW_1$, $BW_2$ (e.g., 6 Gb/s, 4 Gb/s). Note that in this example, both the file sizes and the rate requirements are monotonically decreasing. In addition, there can be a value $TS_{load}$ that defines a timescale corresponding to how long a leased line must be above its nominal bitrate to be counted as heavy leased line. For example, when a link starts transmission after being silent for a long time, it should be able to maintain its nominal bitrate for $TS_{load}$ assuming that all other links have bad history. Based on these values, the timescales TS corresponding to the columns of R are given by:

$TS=(RTT,FS_1/BW_1,FS_2/BW_2,TS_{load})$ (Eq. 6)

In the above list, the second timescale corresponds to a period needed to download a file with $FS_1$ with $BW_1$ while the third timescale corresponds to a period needed to download a file with $FS_2$ with $BW_2$. The third timescale can be maintained for exactly $TS_{load}$ long interval.

Given these four timescales TS (N=4) and assuming four DPs (M=4), a third plurality of token bucket rate parameters may be determined. In some examples, the third plurality of token bucket rate parameters may be represented in a new matrix R. The first two columns of R can be determined according to the procedures discussed above. The third column of matrix R can be determined based on $TS_{load}$, with $R_{target}=C/N_{LL}$ (i.e., the nominal bitrate). Rather than using the above procedure to determine the third column (which would result in matrix R having a zero element), $C/N_{LL}$ can be divided equally among the first two DPs (e.g., $R_{13}=R_{23}=C/N_{LL}/2$), and $R_{33}$ can be set to $C/N_{LL}$ (rather than to C as in the above procedure). The fourth column of R can be determined according to the above procedure. This results in the following matrix R:

$$R = \begin{bmatrix} NS & NS & NS/2 & f_{guarantee} \cdot \frac{C-BW_1}{N_{LL}-1} \\ BW_1-NS & BW_2-NS & NS/2 & (1-f_{guarantee}) \cdot \frac{C-BW_1}{N_{LL}-1} \\ C & C & NS & NS-R_{14}-R_{24} \\ C & C & C & C \end{bmatrix}, \quad \text{(Eq. 7)}$$

where NS is used to represent the nominal speed $C/N_{LL}$. Using the same exemplary values as in the above procedure together with the exemplary file sizes $FS_1$, $FS_2$ (e.g., 1 Gbyte, 100 Mbytes) and download rate requirements $BW_1$, $BW_2$ (e.g., 6 Gb/s, 4 Gb/s) results in the following numerically-valued R:

$$R = \begin{bmatrix} 2 & 2 & 1 & 0.75 \\ 4 & 2 & 1 & 0.25 \\ 10 & 10 & 2 & 1 \\ 10 & 10 & 10 & 10 \end{bmatrix} \quad \text{(Eq. 8)}$$

Figure 5:
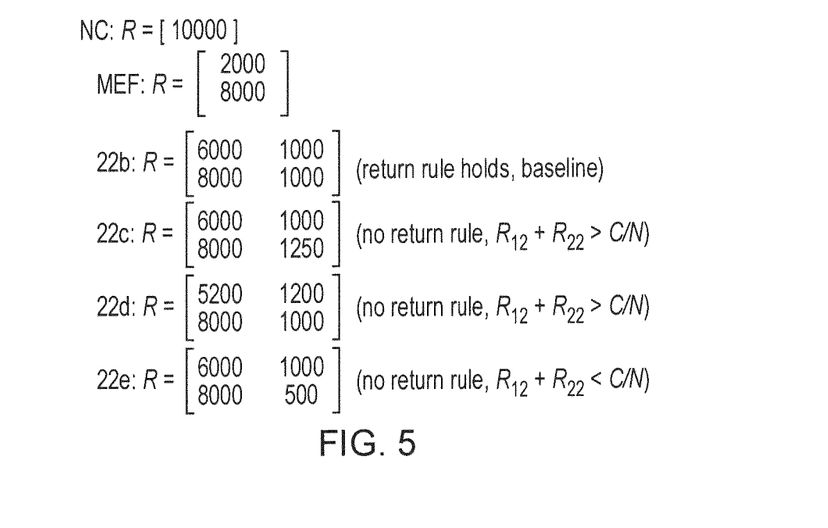
FIGS. 5-6 show results of various simulations used to illustrate the principles and/or operation of the various exemplary embodiments of the present disclosure.
Figure 6:
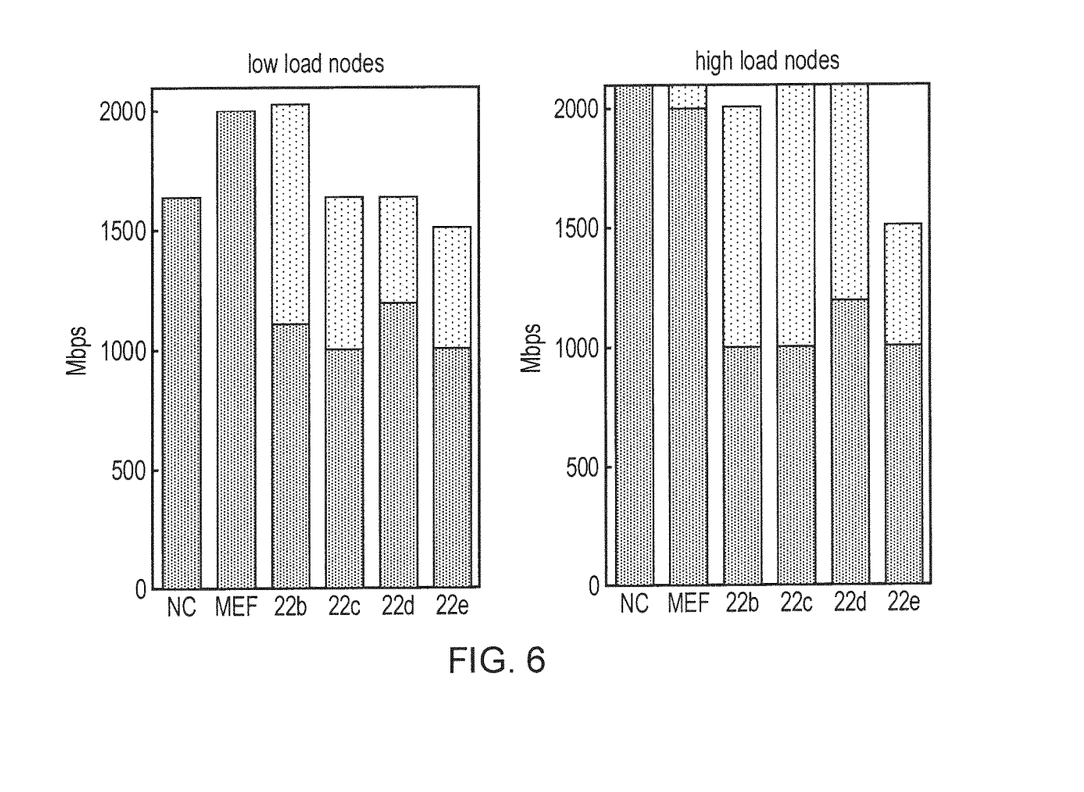

FIGS. 5-6 show the results of various simulations used to illustrate the principles and/or operation of the exemplary embodiments discussed above. The arrangement shown in FIG. 2 of five traffic loads 1-5 feeding a link ($N_{LL}$=5) with capacity C (=10 Gb/s) was used in these evaluations. The nominal values for these five loads are assumed to be [1.5, 1.5, 1.5, 1.5, 0.8] in Gb/s. The file sizes $FS_1$, $FS_2$ (e.g., 1 Gbyte, 100 Mbytes) were used along with a Poisson distribution of file arrival times. FIG. 5 shows five different bandwidth profilers evaluated and their corresponding matrices R. Three of the five profiles do not meet the "return rule," i.e., that the line shall be able to maintain sending with the nominal speed. FIG. 6 shows that when the return rule is not met, even a low-load leased line cannot typically reach its nominal speed ($C/N_{LL}$=2 Gb/s). However, evaluations of the following bandwidth profiler R developed according to the above procedure:

$$44: R = \begin{bmatrix} 2000 & 2000 & 1000 & 500 \\ 4000 & 2000 & 1000 & 500 \\ 8000 & 8000 & 2000 & 1000 \\ 8000 & 8000 & 8000 & 8000 \end{bmatrix} \quad \text{(Eq. 9)}$$

using loads=[2.0, 2.0, 2.0, 0.4, 0.4] showed that the best 10% flow rates for low load leased lines resulted in 6 Gb/s throughput for the 1-Gbyte file and 4 Gb/s throughput for the 100-Mbyte file.

FIG. 8 shows a flow diagram of an exemplary method and/or procedure for regulating transmission of data packets between a first network and a second network over a datalink, according to various exemplary embodiments of the present disclosure. The exemplary method and/or procedure can be performed by a network node (e.g., router, Ethernet switch, or component thereof) in communication with the first network (e.g., an access network) and the second network (e.g., a core network). For example, the exemplary method and/or procedure shown in FIG. 8 can be implemented in a network node configured according to FIG. 9. Although FIG. 8 shows blocks in a particular order, this order is merely exemplary, and the operations of the exemplary method and/or procedure can be performed in a different order than shown in FIG. 8 and can be combined and/or divided into blocks having different functionality. Optional blocks or operations are shown by dashed lines.

Exemplary embodiments of the method and/or procedure illustrated in FIG. 8 can include the operations of block 810, where the network node can determine a first plurality of token bucket rate parameters, each parameter corresponding to a one of a first plurality of packet drop precedence (DP) levels and one of a first plurality of timescales (TS). The network node can determine the first plurality of token bucket rate parameters based on a peak rate requirement, the data link capacity, and a nominal speed requirement associated with the data link. For example, referring to equation 2 the first plurality of token bucket rate parameters may comprise the parameters of R.

In some embodiments, each DP level can be associated with a packet pass probability. In some embodiments, the first plurality of token bucket rate parameters associated with each DP level are arranged in monotonically decreasing order for increasing TS values.

In some embodiments, the operations of block 810 can include the operations of sub-blocks 812-818 that include: determining a first parameter according to a peak rate requirement (sub-block 812); determining a second parameter based on the difference between the peak rate and the data link capacity (sub-block 814); determining a third parameter based on a nominal speed requirement associated with the datalink (sub-block 816); and determining a fourth parameter based on the data link capacity (sub-block 818).

The exemplary method and/or procedure can also include operations of block 820, where the network node can determine a second plurality of token bucket rate parameters based on the first plurality of token bucket rate parameters and a guaranteed rate requirement, wherein the second plurality comprises a further DP level than the first plurality. In some embodiments, the second plurality of token bucket rate parameters associated with each DP level can be arranged in monotonically decreasing order for increasing TS values.

In some embodiments, the operations of block 820 can include the operations of sub-block 822, where the network node can determine a second plurality of DP levels, wherein the second plurality comprises a first DP level corresponding to the further DP level and a second DP level corresponding to a first one of the first plurality of DP levels. For example, referring to equation 3 the first plurality of token bucket rate parameters may comprise the parameters of matrix S.

In these embodiments, the operations of block 820 can also include the operations of sub-block 824, where the network node can determine token bucket rate parameters corresponding to the first and second DP levels based on various factors and/or requirements including: 1) a requirement that, for a particular TS, the sum of the determined token bucket rate parameters for the first and second DP levels must equal a token bucket rate parameter determined for the first one of the first plurality of DP levels; 2) a guaranteed rate requirement according to an average capacity of lines comprising the data link; and 3) a fractional guarantee factor relating the first DP level and the second DP level.

In some embodiments, the second plurality of DP levels further includes a highest DP level. In these embodiments, the operations of block 820 can also include the operations of block 826, where the network node can set each of the token bucket rate parameters associated with the highest DP level to the data link capacity.

In some embodiments, the exemplary method and/or procedure can also include the operations of block 830, where the network node can determine a third plurality of token bucket rate parameters based on: 1) the second plurality of token bucket rate parameters; 2) a plurality of file sizes for files expected to be sent between the first network and the second network via the data link; and 3) a plurality of file bandwidth requirements associated with the respective file sizes. For example, referring to equation 7 the third plurality of token bucket rate parameters may comprise the parameters of matrix R. In some embodiments, the third plurality of token bucket rate parameters can comprises an additional DP level than the second plurality of token bucket rate parameters. In some embodiments, the operations of block 830 can also include the operations of sub-block 832, where the network node can determine the first plurality of TS based on: 1) the plurality of file sizes; 2) the plurality of file bandwidth requirements; and 3) a duration which a leased line comprising the data link must be above its nominal bitrate to be considered a heavy leased line.

The exemplary method and/or procedure can also include the operations of block 840, where the network node can regulate data packets sent between the first network and the second network via the data link based on the second plurality of token bucket rate parameters. In the embodiments comprising the operations of block 830, the operations of block 840 can also include the network node regulating the data packets sent between the first network and the second network via the data link based on the third plurality of token bucket rate parameters, which were determined based on the second plurality of token bucket rate parameters. In some embodiments, the operations of block 840 can include the operations of sub-block 842, where the network node can perform one of the following operations based on the DP level marked on each data packet: forwarding the data packet to the first network, forwarding the data packet to the second network, and discarding the data packet.

In some embodiments, the first and second networks can include, respectively, a radio access network (RAN) and a core network (CN) that comprise a cellular communication network, The RAN can include one or more base stations, and the data link can comprise a plurality of leased lines used for backhaul between the one or more base stations and the CN. In some embodiments, at least one of the first, second, and third pluralities of token bucket rate parameters is associated with a service level agreement (SLA) for a plurality of leased lines comprising the data link.

Figure 9:
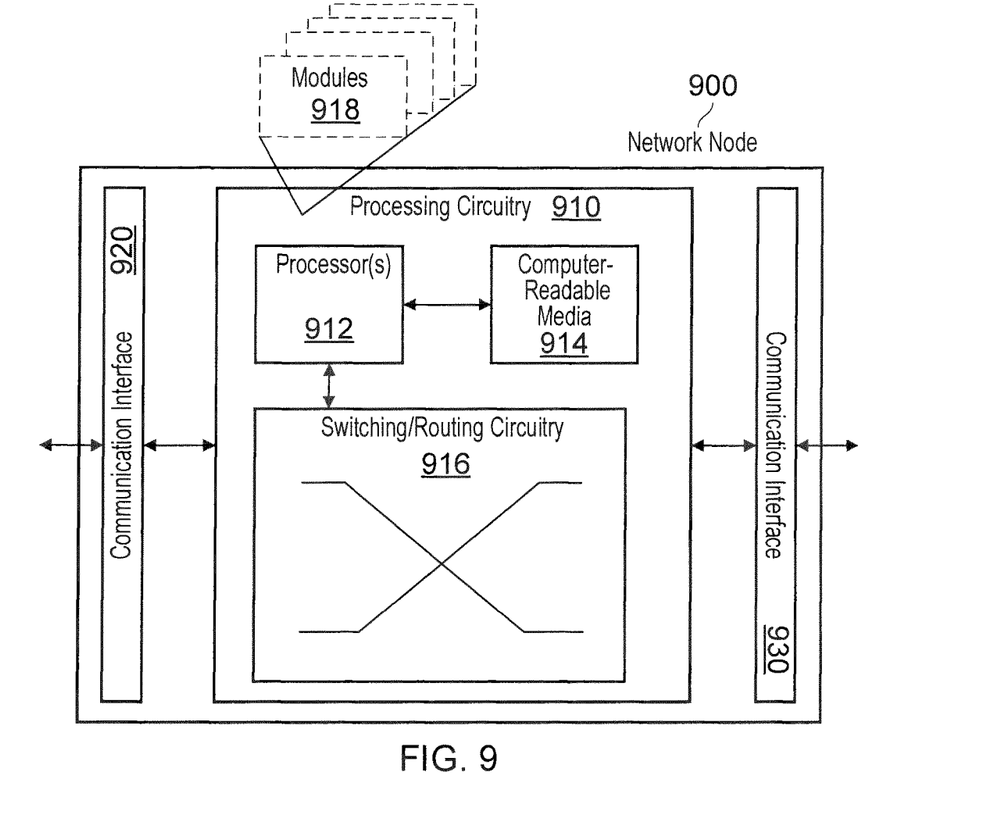
FIG. 9 is a block diagram of an exemplary network node according to various exemplary embodiments of the present disclosure.

FIG. 9 shows a block diagram of an exemplary network node 900 according to various embodiments of the present disclosure. For example, exemplary network node 900 can be configured by execution of instructions, stored on a computer-readable medium, to perform operations corresponding to one or more of the exemplary methods and/or procedures described above. In some exemplary embodiments, network node 900 can comprise a router, Ethernet switch, or other node that can regulate the flow of data traffic between a first network and a second network over a data link according to a service level agreement (SLA). In some embodiments, network node 900 can be a component of the first network or the second network. More generally, the functionally of network node 900 can be distributed across various physical devices and/or functional units, modules, etc.

At a high level, network node 900 comprises processing circuitry 910 and communication interfaces 920 and 930. For example, communication interface 920 can be configured to communicate with the first network (e.g., an access network) and communication interface 930 can be configured to communicate with the second network (e.g., a core network). In some embodiments, interfaces 920 and 930 can be combined logically and/or functionally into a single interface that can communicate with all networks for which network node 900 handles data traffic on the data link. By way of example and without limitation, either or both of interfaces 920 and 930 can handle traffic on one or more S1 interface and/or one or more X2 interfaces in the LTE network shown in FIG. 1.

At a lower level, interfaces 920 and 930 can comprise various transmitters, receivers, and other circuitry that enables network node 900 to communicate with other equipment according to established protocols and/or standards, such as asynchronous transfer mode (ATM), Internet Protocol (IP)-over-Ethernet, SDH over optical fiber, etc.

At a lower level, processing circuitry 910 can include one or more processors 912 that are operably connected to a computer-readable medium 914 via one or more busses, ports, or other such structures that can be used for processor communication. For example, medium 914 can be a program memory storing software code (e.g., computer-executable program instructions) that can be retrieved and executed by processor 910. Execution of such program instructions and/or software code can configure and/or facilitate network node 900 to operate according to various embodiments of the present disclosure, including one or more exemplary methods and/or procedures discussed above. Medium 914 can further comprise software code executed by processor 912 to control the functions of network node 900, including configuring and controlling various components such as communication interfaces 920 and 930.

Medium 914 can also comprise memory area for processor 912 to store variables used in protocols, configuration, control, and other functions of network node 900. As such, medium 914 can comprise non-volatile memory (e.g., flash memory, hard disk, etc.), volatile memory (e.g., static or dynamic RAM), network-based (e.g., "cloud") storage, non-transitory computer-readable medium storing computer-executable instructions, or a combination thereof. As noted above, processor 912 can comprise multiple individual processors (not shown), each of which implements a portion of the functionality described above. In such case, multiple individual processors may be commonly connected to medium 914 or individually connected to multiple individual memories comprising medium 914.

Processing circuitry 910 can also include switching/routing circuitry 916, which can be configured by processor 912 to switch, route, and/or regulate traffic passing between communication interfaces 920 and 930. For example, switching/routing circuitry 916 can be an Ethernet packet switch that can be configured to perform various traffic shaping techniques discussed herein, such as by using token buffers. More generally, switching/routing circuitry 916 can cooperate with processor 912 to facilitate performance, by processing circuitry 910, of operations corresponding to any of the exemplary methods and/or procedures discussed herein.

More generally, persons of ordinary skill in the art will recognize that various protocols and other functions of network node 900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware. For example, as illustrated in FIG. 9, processing circuitry 910 can be implemented as a plurality of modules 918 that operative cooperatively. Each module 918 can comprise various combinations of hardware and/or software configured to implement a particular portion of the functions performed as a whole by processing circuitry 910.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

As described herein, a "network node" can correspond to any type of node, in a network, that can communicate with a UE and/or with one or more other network nodes. Examples of network nodes include multi-standard radio (MSR) radio node (such as MSR BS), eNodeB (or eNB), gNodeB (or gNB), MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), Ethernet switch, router, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for regulating transmission of data packets between a first network and a second network over a datalink, the method comprising:
   determining a first plurality of token bucket rate parameters, each parameter corresponding to a one of a first plurality of packet drop precedence (DP) levels and one of a first plurality of timescales (TS), determining the first plurality of bucket rate parameters being based on a peak rate requirement, a data link capacity, and a nominal speed requirement associated with the data link, the first plurality of token bucket rate parameters associated with each DP level being arranged in monotonically decreasing order for increasing TS values;
   determining a second plurality of token bucket rate parameters based on the first plurality of token bucket rate parameters and a guaranteed rate requirement, the second plurality of token bucket rate parameters comprising a further DP level than the first plurality of token bucket rate parameters; and
   regulating data packets sent between the first network and the second network via the data link based on the second plurality of token bucket rate parameters, the second plurality of token bucket rate parameters associated with each DP level being arranged in monotonically decreasing order for increasing TS values.

2. The method of claim 1, wherein each DP level is associated with a packet pass probability.

3. The method of claim 1, further comprising;
   determining a third plurality of token bucket rate parameters based on:
      the second plurality of token bucket rate parameters;
      a plurality of file sizes for files expected to be sent between the first network and the second network via the data link; and
      a plurality of file bandwidth requirements associated with the respective file sizes; and
   regulating the data packets sent between the first network and the second network via the data link according to the third plurality of token bucket rate parameters.

4. The method of claim 3, wherein the third plurality of token bucket rate parameters comprises a further DP level than the second plurality of token bucket rate parameters.

5. The method of claim 3, further comprising determining the first plurality of TS based on:
   the plurality of file sizes;
   the plurality of file bandwidth requirements; and
   a duration which a leased line comprising the data link must be above its nominal bitrate to be considered a heavy leased line.

6. The method of claim 1, wherein determining the first plurality of token bucket rate parameters comprises:
   determining a first parameter according to a peak rate requirement;
   determining a second parameter based on the difference between the peak rate requirement and the data link capacity;
   determining a third parameter based on a nominal speed requirement associated with the datalink; and
   determining a fourth parameter based on the data link capacity.

7. The method of claim 1, wherein determining the second plurality of token bucket rate parameters comprises:
   determining a second plurality of DP levels, wherein the second plurality of DP levels comprises a first DP level corresponding to the further DP level and a second DP level corresponding to a first one of the first plurality of DP levels;
   determining token bucket rate parameters corresponding to the first and second DP levels based on:
      a requirement that, for a particular TS, a sum of the determined token bucket rate parameters for the first and second DP levels must equal a token bucket rate parameter determined for the first one of the first plurality of DP levels;
      a guaranteed rate requirement according to an average capacity of leased lines comprising the data link; and
      a fractional guarantee factor relating the first DP level and the second DP level.

8. The method of claim 7, wherein the second plurality of DP levels further includes a highest DP level, and determining the second plurality of token bucket rate parameters comprises setting each of the second plurality of token bucket rate parameters associated with the highest DP level to the data link capacity.

9. The method of claim 1, wherein the first and second networks comprise a radio access network (RAN) and a core network (CN) that comprise a cellular communication network, and wherein RAN comprises one or more base stations, and wherein the data link comprises a plurality of leased lines used for backhaul between the one or more base stations and the CN.

10. The method of claim 1, wherein at least one of the following is associated with a service level agreement (SLA) for a plurality of leased lines comprising the data link:
   the first plurality of token bucket rate parameters, the second plurality of token bucket rate parameters, and the third plurality of token bucket rate parameters.

11. The method of claim 1, wherein regulating data packets sent between the first network and the second network comprises performing one of the following operations based on a DP level marked on each data packet:
   forwarding the data packet to the first network, forwarding the data packet to the second network, and discarding the data packet.

12. A network node configured to regulate transmission of data packets between a first network and a second network over a datalink, the network node comprising:
   a communication interface configured to communicate with the first network and the second network; and
   processing circuitry operatively associated with the communication interface and configured to:
   determine a first plurality of token bucket rate parameters, each parameter corresponding to a one of a first plurality of packet drop precedence (DP) levels and one of a first plurality of timescales (TS), determining the first plurality of bucket rate parameters being based on a peak rate requirement, a data link capacity, and a nominal speed requirement associated with the data link, the first plurality of token bucket rate parameters associated with each DP level being arranged in monotonically decreasing order for increasing TS values;
   determine a second plurality of token bucket rate parameters based on the first plurality of token bucket rate parameters and a guaranteed rate requirement, the second plurality of token bucket rate parameters comprises a further DP level than the first plurality of token bucket rate parameters, the second plurality of token bucket rate parameters associated with each DP level being arranged in monotonically decreasing order for increasing TS values; and
   regulating data packets sent between the first network and the second network via the data link based on the second plurality of token bucket rate parameters.

13. A non-transitory, computer-readable medium storing computer-executable instructions that, when executed by at least one processor of a network node, configure the network node to:
   determine a first plurality of token bucket rate parameters, each parameter corresponding to a one of a first plurality of packet drop precedence (DP) levels and one of a first plurality of timescales (TS), determining the first plurality of bucket rate parameters being based on a peak rate requirement, a data link capacity, and a nominal speed requirement associated with the data link, the first plurality of token bucket rate parameters associated with each DP level are arranged in monotonically decreasing order for increasing TS values;
   determine a second plurality of token bucket rate parameters based on the first plurality of token bucket rate parameters and a guaranteed rate requirement, the second plurality of token bucket rate parameters comprising a further DP level than the first plurality of token bucket rate parameters, the second plurality of token bucket rate parameters associated with each DP level being arranged in monotonically decreasing order for increasing TS values; and
   regulating data packets sent between a first network and a second network via the data link based on the second plurality of token bucket rate parameters.

14. The method of claim 2, further comprising;
   determining a third plurality of token bucket rate parameters based on:
      the second plurality of token bucket rate parameters;
      a plurality of file sizes for files expected to be sent between the first network and the second network via the data link; and
      a plurality of file bandwidth requirements associated with the respective file sizes and
   regulating the data packets sent between the first network and the second network via the data link according to the third plurality of token bucket rate parameters.

15. The method of claim 14, wherein the third plurality of token bucket rate parameters comprises a further DP level than the second plurality of token bucket rate parameters.

16. The method of claim 14, further comprising determining the first plurality of TS based on:
   the plurality of file sizes;
   the plurality of file bandwidth requirements; and
   a duration which a leased line comprising the data link must be above its nominal bitrate to be considered a heavy leased line.

17. The method of claim 2, wherein determining the first plurality of token bucket rate parameters comprises:
   determining a first parameter according to a peak rate requirement;
   determining a second parameter based on the difference between the peak rate requirement and the data link capacity;
   determining a third parameter based on a nominal speed requirement associated with the datalink; and
   determining a fourth parameter based on the data link capacity.

18. The method of claim 2, wherein determining the second plurality of token bucket rate parameters comprises:
   determining a second plurality of DP levels, wherein the second plurality of DP levels comprises a first DP level corresponding to the further DP level and a second DP level corresponding to a first one of the first plurality of DP levels;
   determining token bucket rate parameters corresponding to the first and second DP levels based on:
      a requirement that, for a particular TS, a sum of the determined token bucket rate parameters for the first and second DP levels must equal a token bucket rate parameter determined for the first one of the first plurality of DP levels;
      a guaranteed rate requirement according to an average capacity of leased lines comprising the data link; and
      a fractional guarantee factor relating the first DP level and the second DP level.

19. The method of claim 18, wherein the second plurality of DP levels further includes a highest DP level, and determining the second plurality of token bucket rate parameters comprises setting each of the second plurality of token bucket rate parameters associated with the highest DP level to the data link capacity.

20. The method of claim 2, wherein the first and second networks comprise a radio access network (RAN) and a core network (CN) that comprise a cellular communication network, and wherein RAN comprises one or more base stations, and wherein the data link comprises a plurality of leased lines used for backhaul between the one or more base stations and the CN.

* * * * *